United States Patent [19]
Kornhauser

[11] 4,176,858
[45] Dec. 4, 1979

[54] ENERGY ABSORBING BUMPER SYSTEM

[75] Inventor: Murray Kornhauser, Wynnewood, Pa.

[73] Assignee: Safety Consultants, Chambersburg, Pa.

[21] Appl. No.: 751,841

[22] Filed: Dec. 17, 1976

Related U.S. Application Data

[60] Division of Ser. No. 687,513, May 18, 1976, which is a continuation of Ser. No. 430,667, Jan. 4, 1974, Pat. No. 3,971,583, which is a continuation-in-part of Ser. No. 126,155, Mar. 19, 1971, Pat. No. 3,810,668.

[51] Int. Cl.² .................. B60R 19/10; B60R 21/06
[52] U.S. Cl. .................... 280/734; 280/736; 280/741; 293/107; 293/117
[58] Field of Search .............. 280/728, 730, 734, 735, 280/736, 737, 741, 742; 293/71 R, 1, 107, 117

[56] References Cited

U.S. PATENT DOCUMENTS

| | | | |
|---|---|---|---|
| 1,784,387 | 12/1930 | Postel | 293/71 P |
| 2,834,606 | 5/1958 | Bertrand | 280/730 |
| 3,370,886 | 2/1968 | Frost | 280/739 |
| 3,588,142 | 6/1971 | Gorman | 280/736 |
| 3,927,901 | 12/1975 | Weman | 280/730 |

FOREIGN PATENT DOCUMENTS

953312  3/1964  United Kingdom .................... 280/728

*Primary Examiner*—David M. Mitchell
*Attorney, Agent, or Firm*—Morton C. Jacobs

[57] ABSTRACT

A pneumatic bumper system for the protection of moving vehicles and passengers therein is used with a passenger safety device such as an inflatable air bag. A pressurized gas container has a flexible portion with an impact surface. The pressure of the compressible gas in this container increases upon impact with an object and causes a valve to open, directing the passage of compressed gas to inflate the air bag.

20 Claims, 23 Drawing Figures

ENERGY ABSORBING BUMPER SYSTEM

BACKGROUND OF THE INVENTION

This application is a division of Ser. No. 687,513, filed May 18, 1976, which is a continuation of Ser. No. 430,667, filed Jan. 4, 1974, now U.S. Pat. No. 3,971,583 issued July 27, 1976, which is a continuation-in-part of copending application Ser. No. 126,155, filed Mar. 19, 1971, now U.S. Pat. No. 3,810,668, issued May 14, 1974, for "Energy Absorbing Bumper System".

This invention relates to an energy-absorbing bumper system for protection of vehicles and passengers.

A large proportion of motor vehicle accidents occur at low speeds, e.g., less than ten miles per hour (mph). These low speed accidents cause a major proportion of the total property damage which results from all motor vehicle accidents. Consequently, various federal and state agencies are becoming active in efforts to minimize this damage. The National Highway Traffic Safety Administration is currently promulgating rules that may require protection of automobile safety related components such as lights, hoods, trunk and door latches, fuel, cooling and exhaust systems, during low speed collisions. Other governmental proposals indicate that motor vehicles may be required to be equipped with bumpers that prevent damage during collisions at speeds of less than 5 to 10 mph. In addition to minimizing property damage, improved bumper systems can also minimize injuries to pedestrians and to passengers of vehicles involved in collisions. Accordingly, a considerable effort has been undertaken by both governmental bodies and the automobile industry to minimize damage to both property and persons caused by low speed collisions, since they represent a large percentage of the accidents and of the associated economic losses.

The National Highway Traffic Safety Administration is also promulgating safety rules in regard to deployment of safety devices (such as air bags, nets, padded blankets, or other soft media) for cushioning the passengers inside the car, in the event of potentially dangerous crashes at impact velocities of 10–30 mph or greater. In the development of this invention, it was recognized that the bumper system could be used to sense the impact velocity of the vehicle and to trigger or otherwise operate such safety devices.

Prior art bumpers which have attempted to improve upon the performance of the conventional automobile bumpers have not come into popular use because of disadvantageous characteristics they have exhibited. Some prior art bumpers have operated on energy storing rather than energy absorbing principles. The former systems store the energy of impact and then, immediately after impact, return it to the motor vehicle. Because of the immediate return of energy, those systems behave like springs and thereby produce a potentially dangerous rebound. A vehicle having such a system may strike a vehicle ahead of it and then rebound and strike another closely following vehicle or be propelled at an angle into the path of opposing traffic, thereby resulting in an even more serious accident. Some prior art systems have sought to minimize rebound by providing an energy-absorbing rather than an energy-storing device. However, where those systems have not provided immediate resetting of the energy absorbing device, the vehicle cannot be protected against repeated shocks as in a chain collision. Other prior art systems, such as pneumatic bumpers, have suffered from lack of effectiveness as well as from both cost and cosmetic disadvantages. They have not been sufficiently adaptable to the great variety of sizes and styles of motor vehicles, nor have they provided the ease of style variation that is prominent in the manufacture of automobiles.

SUMMARY OF THE INVENTION

Accordingly, it is an object of this invention to provide an improved bumper system.

Another object is to provide a bumper system which tends to reduce damage to property and to people during lowspeed collisions.

Another object is to provide a bumper system of sufficient design flexibility to be adaptable to provide bumpers with afford protection during high-speed collisions.

Another object is to provide a new and improved pneumatic bumper.

Another object is to provide a pneumatic impact velocity sensor.

Another object is to provide means for sensing pneumatic pressure increases and the rate of pressure increase in the bumper system, for purposes of triggering, actuating or inflating safety devices in the passenger compartment of the vehicle.

In accordance with some forms of this invention, a bumper system is provided which includes a container formed in two sections, one a rigid section and the other a flexible section having an impact wall. The two sections are interconnected for controlled air passage from the flexible impact section to the rigid section upon impact, and back to the impact section after impact. The impact section is generally enclosed, in one form, by the flexible impact wall and the adjacent wall of the rigid section; in another form, the impact section is a substantially fully enclosed flexible bag. The rigid section, in different forms, is a rigid tank and a flexible-walled container. The impact section, in certain embodiments, is formed in compartments, which contributes to improved operation and maintenance, and each compartment may in turn be formed into sub-compartments. Thereby, a considerable amount of flexibility is afforded in ornamental design of bumper shapes. In addition, with this and other constructions, a substantially flat impact surface is achieved and a substantially rectangular impact force-versus-deflection characteristic. The pneumatic bumper system of this invention makes it possible to reliably sense impact velocity for controlling the operation of auxiliary safety equipment and to furnish a source of pressurized air for emergency use in such equipment.

BRIEF DESCRIPTION OF THE DRAWING

The foregoing and other objects of this invention , the various features thereof, as well as the invention itself, may be more readily understood from the following description when read together with the accompanying drawing, in which.

DESCRIPTION OF A PREFERRED EMBODIMENT

In the bumper system shown in FIGS. 1–4, the bumper 15 comprises a flexible hollow impact cushion or bag 20 which contains pressurized air. Impact bag 20 may be fabricated of rubberized fabric, plastic coated fabric, molded plastic, or a lightweight wire mesh impregnated with plastic or a rubber. The latter fabrication will provide special protection against abrasion and cutting. Impact bag 20 is mounted on an approximately cylindrically shaped air-tight rigid section 22. Rigid section 22 is constructed of a thin gauge metal, such as a thin sheet metal (e.g. 19 gauge) used for ordinary automobile bodies and fenders, so that it can be fabricated at low cost. This rigid portion of the bumper has a generally cylindrical shape and has attached thereto a front-surface support bracket 24 shaped to follow the contour of bag 20 and to provide maximum support thereto. Dome-shaped end caps 26 and 28 are welded into the cylinder to provide an air-tight container. The rigid section thus formed has a volume approximately equal to and preferably greater than that of the bag.

Figure 3:
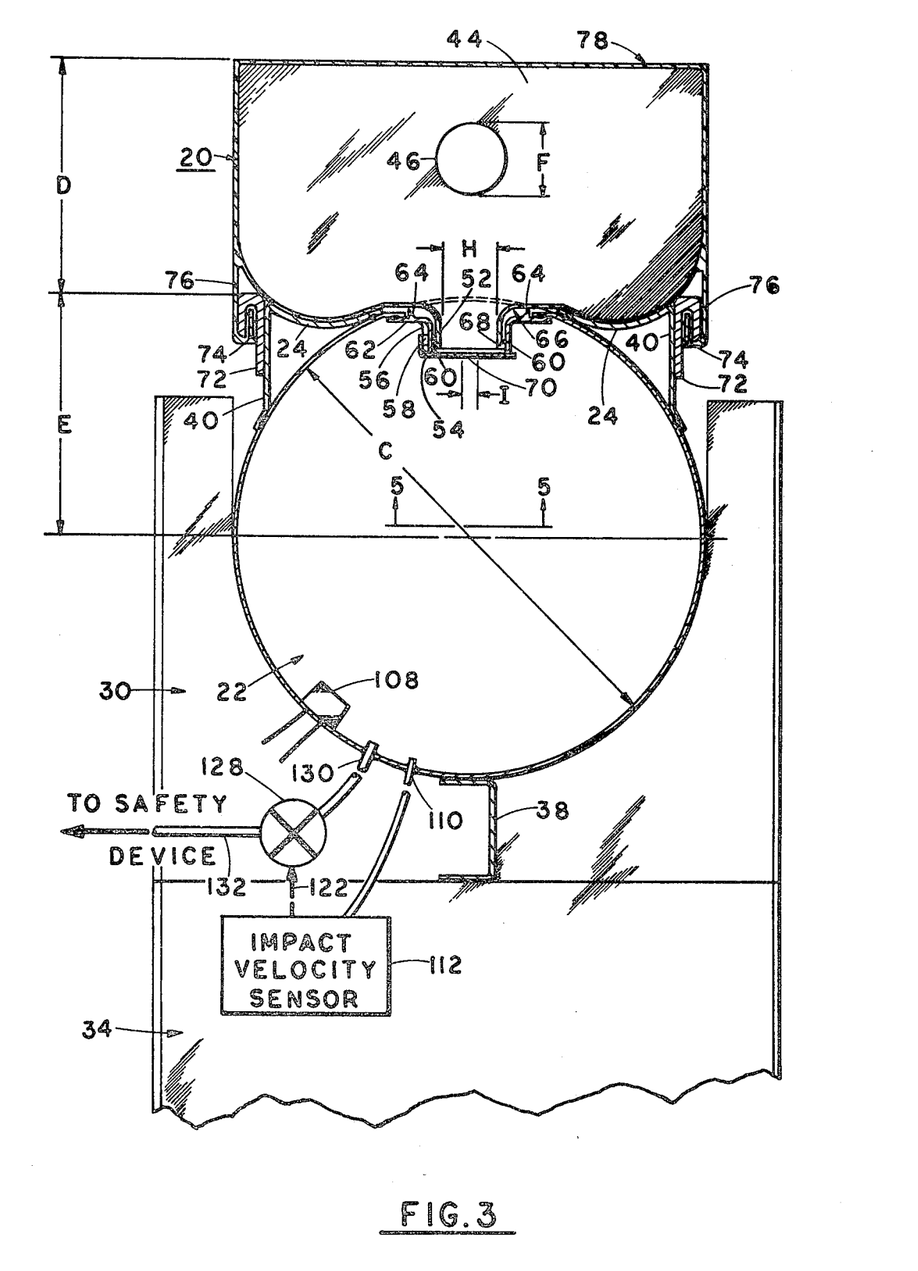
FIG. 3 is a sectional view of the bumper of FIG. 1.

Support brackets 30 and 32 in a yoke shape are fastened to and embrace the back and sides of the rigid section so as to mount and fasten the bumper to the vehicle main frame members 34 and 36, respectively, by means of a load tie 38, which is a channel shaped metallic member that extends along most of the back side of the rigid section and laterally between the frame members to which it is attached. Bracket 24 has a generally flat forward surface with dishing cross-sectional curvature (as indicated in FIG. 3) and with spaced apertures therein as noted hereinafter. In addition, bracket 24 has bent-back flanges 40, and the latter are fastened (e.g. welded) to the rigid section, as is the forward surface at its tangent tines. The bracket flanges 40 have free ends at each end of the rigid section, and are used for securing the flexible impact bag 20 to the rigid section.

The length of impact bag 20 is divided into several (e.g. nine) separate compartments 41 by transverse webs 42 that extend internally across the inside of the bag and are bonded thereto around the entire inner periphery thereof. Each separate compartment is further divided into subcompartments 43 by several contour support webs 44. For clarity, contour support webs are shown only in the cutaway portion of one compartment 41 of FIGS. 1 and 2. However, each such compartment formed by the webs 42 is subdivided by contour support webs similar to those shown. The purpose of the contour support webs is to give structural support to the exterior surface (and particularly the front face) of the impact bag so as to shape it in the desired contour. By means of these contour webs, the impact bag is shaped for optimum operational characteristics and sizing, as well as for ornamental appearance. Each contour web 44 has a hole 46 therethrough, to allow relatively free passage of air between subcompartments, whereby each compartment functions as a unit pneumatically. The structure heretofore described is shown more clearly in FIG. 3, which is an enlarged view of Section 3—3 of FIG. 1, and in FIG. 4, which is an enlarged view of Section 4—4 of FIG. 2.

Figure 4:
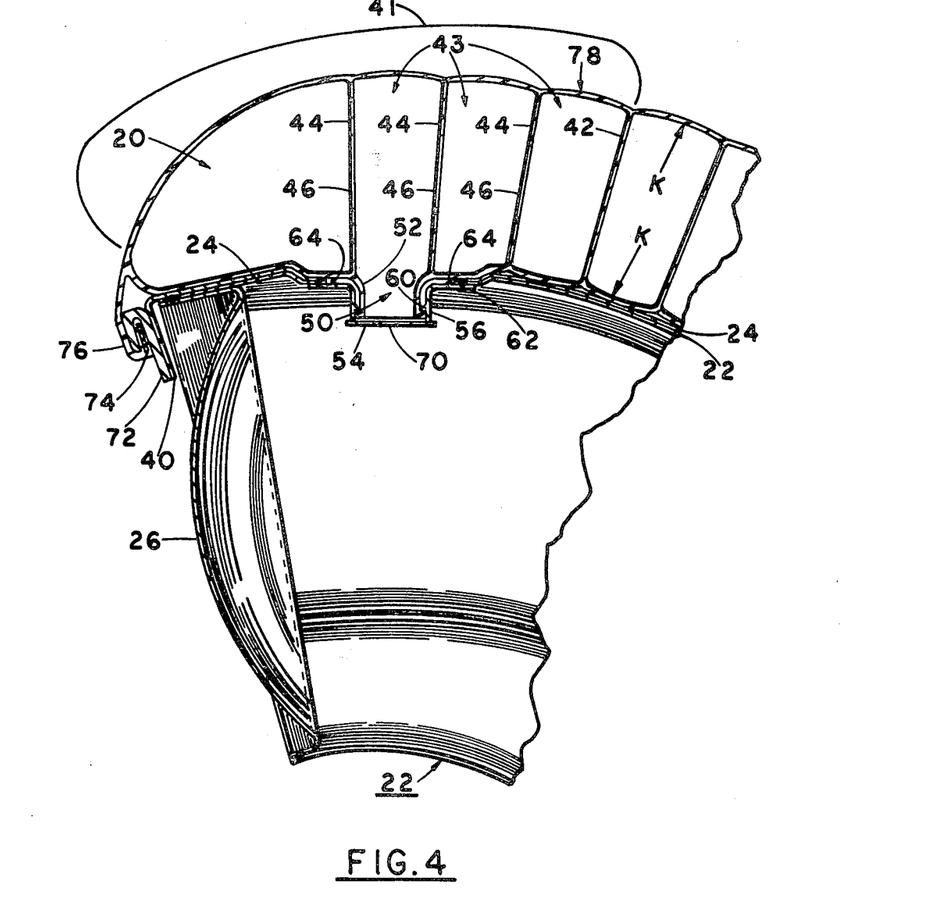
FIG. 4 is a sectional view of the bumper shown in FIG. 2.
Figure 5:
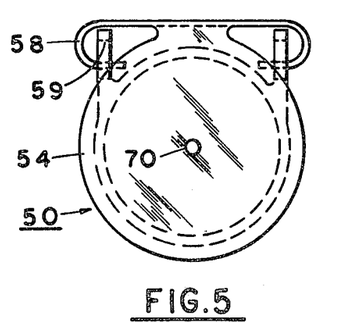
FIG. 5 is a plan view of the flapper check valve as seen along the line 5—5 of FIG. 3.
Figure 6:
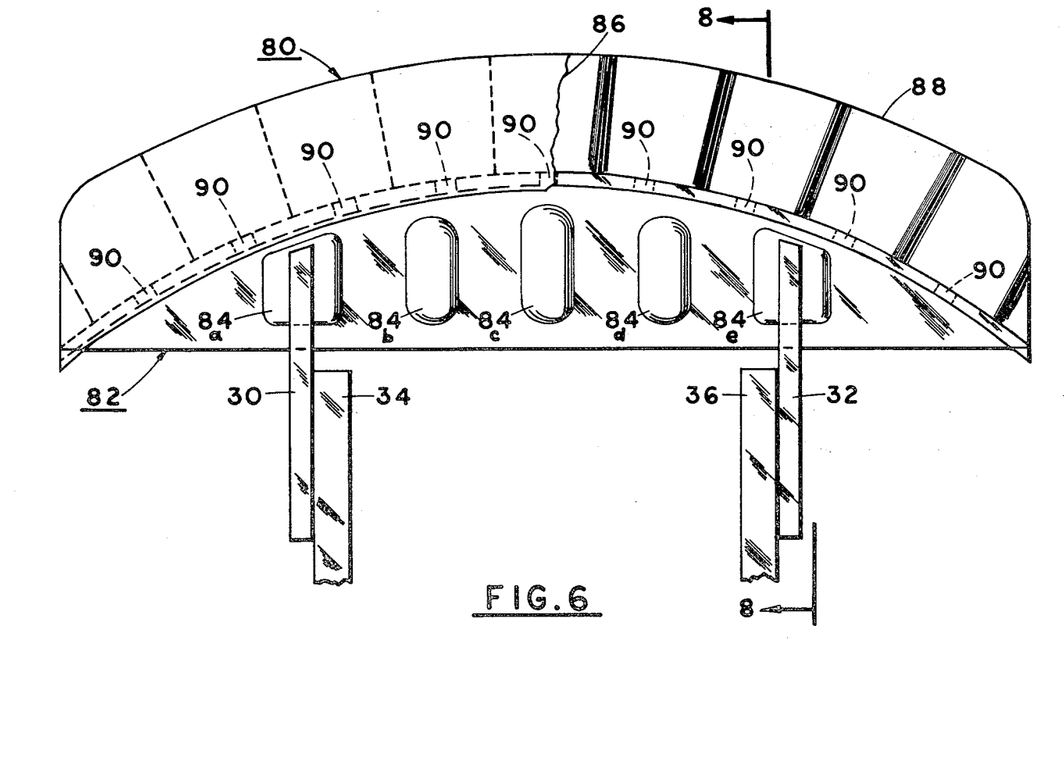
FIG. 6 is a plan view of an alternative embodiment of the invention.
Figure 7:
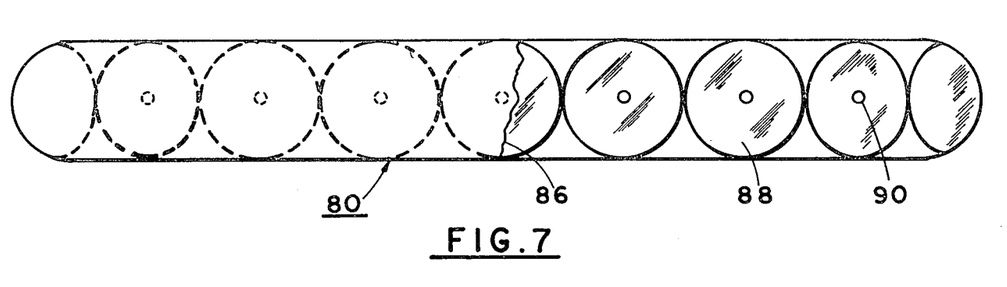
FIG. 7 is a front view of the embodiment shown in FIG. 6.
Figure 8:
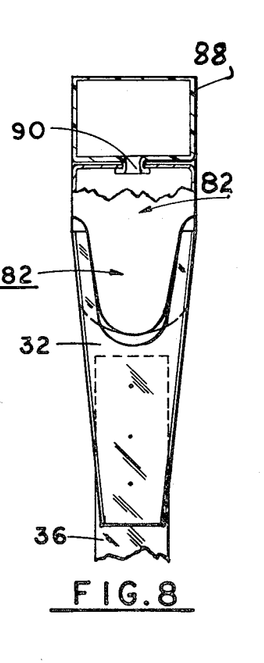
FIG. 8 is a sectional view of the bumper of FIG. 6.

Each compartment 41 of impact bag 20 is connected to rigid section 22 by a port 52 fitted with a check and orifice bleed valve 50 (FIGS. 2-5). Any check valve which is normally closed by gravity and/or a spring or the equivalent may be used. The detailed structure of a preferred form of valve is shown in FIGS. 3-5. The valve 50 may be formed of metal or a rigid plastic which surrounds and retains inside the rigid section the flexible neck of port 52. The exit of the valve (or alternatively the neck of the port) is covered by a hinged, stiff flapper member 54 which normally closes the valve under gravity, but can be opened under internal pressure created upon impact in bag 20. Flapper 54 is pivotally connected to the neck portion 56 of the valve 50 by a hinge hook 58 which pivots in an elongated slot 59 in the neck 56 for opening and closing; the slot makes it possible for the flapper to pivot and to seat readily without a precision fabrication.

A sharp internal ridge 60 is formed around the neck portion 56 of the valve, and a second sharp internal ridge 64 is formed about the attachment flange 62 of the valve (which flange is fastened and sealed to the inside rim of a valve hole in rigid section 22). The space 66 between the ridges 62 and 64 and between the port 52 and valve 50 is vented by small passages (not shown) to ambient pressure, so that internal pressure in the flexible bag in the region of space 66 seals the bag surface to the valve. A bead 68 at the mouth of the port 52 is retained in position by the sharp ridge 60 and serves to position the port 52 during assembly. Flapper 54 has a small bleeder orifice 70 to allow equalization of air pressure in flexible section 20 and rigid section 22 when valve 50 is closed.

Impact bag 20 can be installed on rigid section 22 without use of fasteners, thereby enabling advantageous reduction in assembly and maintenance time as well as original fabrication costs. The structure for accomplishing this is shown in FIGS. 3 and 4. A hook-shaped retainer 72 extends around the rigid section and is fastened to adapter bracket 40 (the retainer 72 may also be formed in separate sections bolted to or otherwise secured to the bracket 40). Impact bag 20 has a flap edge portion 76 (or separate portions spaced around the bag) which has a rigid strip 74 secured in the outer end thereof, which stiffened end is inserted in the hook of retainer 72. The hook-shaped retainer 72 and flap 76 extend completely around the outer surface of the impact bag. Thus, the stiffened end of the flap 76 is held tightly in the retainer when the impact bag is inflated, without requiring fasteners such as bolts. The flap 76 may be inserted in the retainer 72 and the latter then bolted onto the bracket 40. Alternatively, the flaps 76 can be secured to the retainers 72 (without removing the latter) in a manner similar to that used in mounting a tire bead over a wheel rim. With the bag deflated, there is sufficient slack to permit connection of the flaps 76 in the retainer 72, which flaps are fully tightened when the bag is inflated. Impact bag 20 is inflated by means of a valve 79 which is mounted on the rigid section (or on the bag itself).

Theory of Operation of the Invention

The bumper system of the invention operates under normal conditions with the same pressure in the flexible impact bag 20 and rigid section 22, since the flexible and rigid sections communicate via the series of ports 52 and valve 50. When the bumper strikes a rigid barrier, the kinetic energy of the vehicle is converted to potential energy by compressing the air in the bag. The kinetic energy is:

$$KE = \tfrac{1}{2}mv^2 \qquad (1)$$

where m is the vehicle mass and v is the vehicle velocity. The potential energy is:

$$PE = \int_0^s p\, A\, ds \qquad (2)$$

where A is the bag area touching the barrier, p is the instantaneous pressure and s is the stroke (i.e. decrease in depth of the bumper). Thus, the bumper characteristics, area, pressure and stroke, needed to afford protection for a vehicle of given mass, can be determined by equating equations 1 and 2; the integration from o to s in equation 2 is employed because both area and pressure vary with the stroke. At the end of the stroke, vehicle velocity v is zero an the bag volume is reduced to a small fraction of the original volume. The air pressure in the bumper is increased because of this volume decrease, and is approximately the same in the bag and in the rigid section, since the associated valve 50 is open for essentially free passage of air. After the impact, the vehicle velocity is zero and all of the absorbed kinetic energy is converted to potential energy in the form of increased air pressure. Since the major portion of the air mass under pressure is pushed from the bag into the rigid section, most of the potential energy is stored therein.

After impact, the interconnecting ports between bag and rigid section are closed by the valve closures 54 when the bag pressure starts to fall. Thus the portion of the potential energy stored in the rigid section cannot return rapidly to the impact bag and therefore cannot contribute to rebound, and the energy remaining in the bag due to less than complete exhaustion will tend to be minor and often negligible. After impact with an obstacle, when the bag is no longer compressed by the obstacle, the volume of the bag increases under its high internal pressure until the pressure inside the bag becomes equal to the ambient pressure. At this point, the bag is limp and the air pressure in the rigid section is higher than the air pressure in the bag, under which condition the valve closures 54 are held closed. Since the valve closures contain small bleeder holes 70, the higher-pressure air in the rigid section bleeds back into the bag and restores the original bag contours and pressure. The bleeder hole size, and thereby the rate of recovery, is designed to avoid harmful contribution to rebound. When the air bleeds back into the bag, the potential energy in the rigid section is reconverted to kinetic energy and the kinetic energy is dissipated in turbulent motion and heat in the bag. The time for this recovery is much greater than the small fraction of a second during which there is danger of rebound, and of the order of a second, so that the system recovers rapidly to be operational for another impact as may occur in multi-car collisions.

In normal operation, internal air pressures are applied to the walls of the impact bag and the rigid section, with the effective tensions of the flexible and rigid sections being in opposite directions at the bag-to-rigid section joint. The forces in the bag and rigid section are all in balance with no net force applied to the bracket members 30, 32, 38 and to the vehicle frame members 34, 36. Upon impact, the bag crumples and the pressures in the rigid section, which are no longer balanced by the opposing bag pressures, act on the brackets 30, 32, 38 in a direction to decelerate the vehicle. Effectively, the force generated by the obstacle impact with the vehicle is the impacted area of the bag times the internal air pressure, and this force is transferred by a column of compressed air to the rear wall of the rigid section and thence to the support brackets and vehicle.

The energy that can be absorbed by the bumper system of the invention is directly dependent on the air pressure within the impact bag, the surface area over which the impact is to be absorbed, and the stroke or depth of the bumper. Since, for size and cosmetic reasons, it is desirable to minimize the depth of the bumper, it is especially desirable to maximize the frontal area of the impact bag upon which the impact is to be absorbed. To accomplish this, the impact bag cross-section is made generally rectangular in cross-section with a substantially flat front face 78, as shown in FIG. 3. The flat front face receives the impact pressure over a larger contact area than if an impact bag of round cross-section were used. Consequently, larger decelerating forces can be achieved on first contact, and a shorter stroke or bag deflection can absorb the impact energy. Thereby, the bumper can be designed to protrude less from the front and rear ends of the vehicle than if a round-shaped impact face were employed. In addition, the flat face bumper functions with a more nearly uniform load-stroke or deceleration level.

The flat forward or impact surface 78 of the impact bag is maintained by full vertical webs 42 and contour support webs 44. The smaller the spacing J (FIG. 2) between adjacent webs (i.e. the narrower the subcompartment) with respect to bumper height G, the flatter (the larger the radius of curvature of) the front surface of the bumper. A nearly flat surface is achieved when the web spacing is small with respect to (e.g. about 25% or less) the bumper height. However, there are no upper or lower limits of web spacing that may be used. The exterior surface can be made entirely flat (or any other desired ornamental shape) by adding extra non-functional material (e.g. in the depressions at each contour web shown in FIG. 4) to provide the desired surface while maintaining the interior surface in the shape necessary to carry the structural loads.

The total energy that can be dissipated by the bumper is also directly dependent on the number of compartments in impact bag 20 formed by full vertical webs 42. For a given bumper design and level of impact, the greater the number of compartments provided, the greater is the energy that can be dissipated. That is, the energy corresponding to the exhaustion (partial or complete) of one or more compartments is momentarily stored in the rigid section during the prime decelerating stroke (e.g. about 0.1 second on collision of a full size automobile at 5 mph). This energy is essentially not restored during the next comparable time period during which there is danger of rebound, but is slowly returned through orifice 70 over a longer time (e.g. about 1 second). Thus, the energy of exhausted compartments is retained in the rigid section (there is but negligible return of energy to other compartments via their orifices 70) and does not contribute to rebound.

In addition, the division of impact bag 20 into separate compartments prevents catastrophic failure in case one compartment is punctured in an accident. In that event, air is largely prevented from escaping from the rigid section through the punctured compartment via valve 50. The only escape of air would be through the bleeder hole 70 of the valve for the punctured compartment. However, that escape would be negligible during the time of the impact stroke, so that the other compartments would function and be capable of absorbing much of the energy of impact. Moreover, the division of the impact bag into compartments also aids in forming the flat impact face of the bag; the compartments can permit design variations in the impact face (e.g. to be other than flat) so as to accommodate the ornamental requirements of automobiles, and can be used to introduce ornamentation concomitant with meeting safety needs.

Illustrative dimensions and other parameters of the embodiment of the invention of FIGS. 1-4 are shown in Table I, to indicate the relationship of parts described herein and without in any way limiting this invention in its scope. These dimensions and parameters provide a bumper system capable of absorbing sufficient energy (e.g. thousands of foot pounds) to reduce substantially the damage to a 4000 pound vehicle during a 5 mph collision. Other dimensions and parameters can be used to provide different protection.

TABLE I

| Dimension | Size (inches) |
|---|---|
| A (length) | 80 |
| B (flat half length) | 24 |
| C (flat diameter) | 10 |
| D (depth of bag) | 2–4 |
| E (center of rigid section to retainer) | 5 |
| F (hole in contour web) | 1⅜ |
| G (height) | 10 |
| H (port diameter) | 1¼ |
| I (orifice size) | 0.1 to 0.25 |
| J (web spacing) | 2 |
| Radii of Curvature | |
| K (impact bag face) | 5 (typical) |
| L (end height of bag) | 5 |
| M (end depth of bag) | 5 |
| N (end curve of bumper) | 20 |
| Air pressure | 20 to 40 pounds per square inch |

Basic considerations in the configuration of this pneumatic bumper system are weight and bumper projection in front and back of the automobile, both of which are to be minimized. This configuration tends to minimize weight by providing the rigid section as a load-transmitting member, and a pressurized cylinder is an extremely efficient structural element. By virtue of transmitting loads to the rigid section via the compressed air within the soft bag, and thereby avoiding load concentrations (e.g. sharp points or discontinuities), it is possible to use a minimum gauge sheet metal for the rigid section, thus saving weight. The rigid section is placed directly in front of the car's frame, or it can be combined with the frame; and the forces are transmitted to the vehicle frame or chassis members 34 and 36 through load-spreading or distributing attachments in the form of the yokes 30 and 32, thus introducing no stress concentrations which would prevent thin-gauge construction of the rigid section.

Minimum bumper projection is obtained in two ways. First, the rigid section 22 is located inside the exterior contour at the front and rear of the vehicle; that is, within the front facade or grille, and within the sheet metal trim under the trunk of the conventional automobile. Second, the bag projection may be maintained at about 2 inches for the 5 mph design, by approaching the condition of constant load-stroke performance.

Figure 12A:
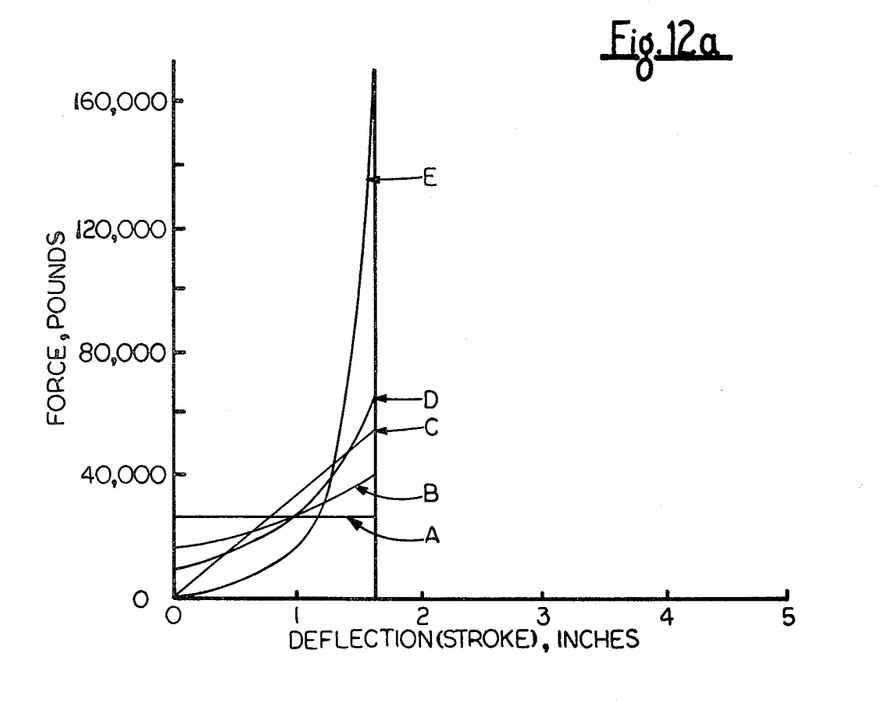
FIGS. 12a and b are idealized diagrams of a load-stroke characteristic used to explain features of this invention.
Figure 12B:
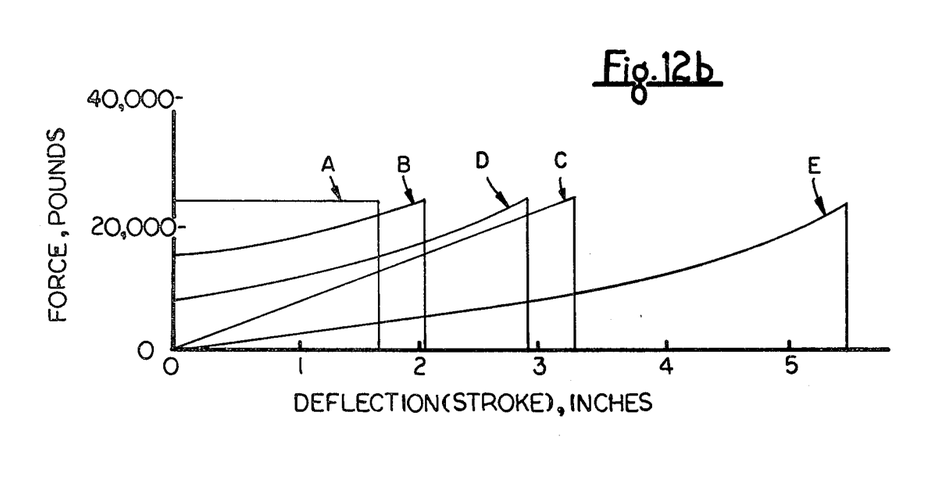

FIGS. 12a and b illustrate the significance of load-stroke curve shape. In all cases, the area under each load-stroke curve is equal to the energy absorbed, e.g. over 3,200 foot pounds for the example assumed.

In FIG. 12a, the five curves have equal stroke and the differences in curve shape are reflected in terms of differences in peak force delivered to the automobile. Curve A is the idealized rectangular load-stroke curve representing the condition of a constant impact force of about 24,000 pounds, corresponding to a uniform deceleration of 6G for a 4,000 pound automobile. An idealized bumper with curve A characteristics has the minimum deflection or stroke of 1⅜ inches. Curve B is the calculated performance of the pneumatic bumper of FIG. 1 with an initial pressure of 30 psi (which corresponds to an initial force of 15,000 pounds) and a final force of 39,000 pounds. Curve C is typical of a spring-supported rigid bumper or other bumper system with a gradual load build-up, and it has a final force of 48,000 pounds. Curve D represents the pneumatic bumper of FIG. 1 modified to show the effects of not utilizing the load-limiting rigid section, but using only the flexible bag volume. In this case the peak force is 67,500 pounds, rather than the 39,000 pounds force of curve B. Curve E is typical of an unpressurized, closed-bag bumper with adiabatic compression of the air to reach a final force of 205,000 pounds. Table II summarizes the peak force results.

TABLE II

Figure 1:
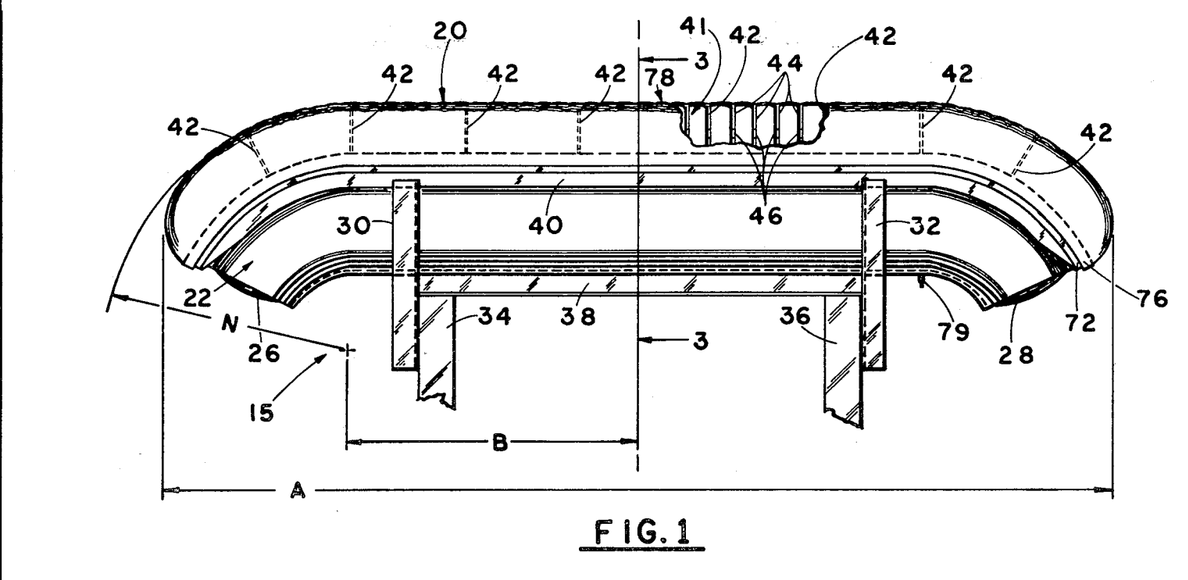
FIG. 1 is a plan view of the bumper system of the invention.
Figure 2:
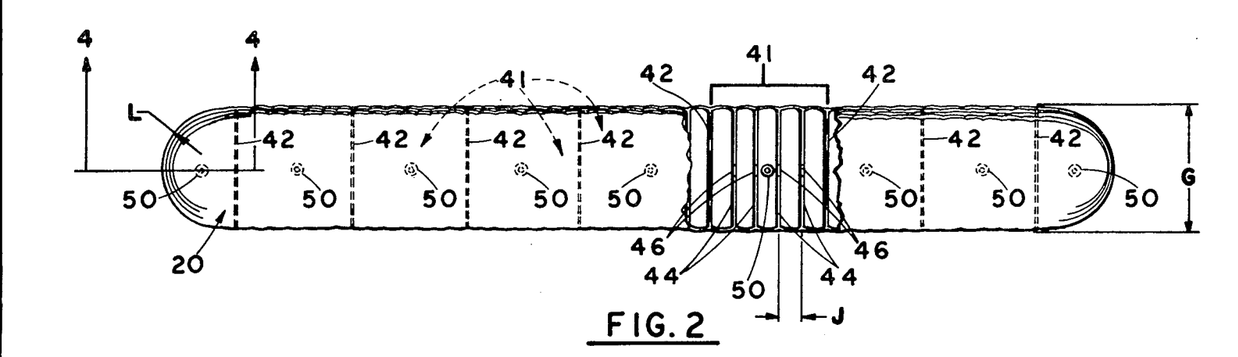
FIG. 2 is a front view of the bumper of FIG. 1.

| PEAK FORCE FOR EQUAL STROKE AND ENERGY ABSORBED | | |
|---|---|---|
| Curve | Bumper Concept | Peak Force, Lbs. |
| A | Ideal rectangular load-stroke | 24,000 |
| B | Pneumatic Bumper of FIG. 1 (30 psi) | 39,000 |
| C | Spring Supported Linear Bumper | 48,000 |
| D | 30 psi Bumper, Flexible Bag Only | 67,500 |
| E | 0 psi Bumper, Flexible Bag Only | 205,000 |

Table II illustrates a key significance of load-stroke curve shape, e.g., for equal stroke there may be great differences in peak force and therefore great differences in the requirement for strength of the automobile frame. Stated another way: for a given stroke and automobile frame strength, it may be necessary to provide an efficient load-stroke curve shape to limit the peak force to a safe value. Note that the peak force of the preferred embodiment of this invention is closest to the ideal minimum of 24,000 pounds.

In FIG. 12b, the five curves have equal peak force and the differences in load-stroke curve shape are reflected in terms of differences in stroke. FIG. 12b is intended to represent the case of an automobile with a specified frame strength (24,000 pounds in this instance) to which may be applied the five bumper concepts, resulting in five different stroke requirements which are the primary concern of the stylists who generally favor the minimum bumper projection for cosmetic appeal. Table III summarizes the stroke results for the 3,200 foot pounds of energy absorbed with a peak force of 24,000 pounds.

TABLE III
STROKE REQUIREMENTS FOR EQUAL PEAK AND ENERGY ABSORBED

| Curve | Bumper Concept | Stroke, Inches |
|---|---|---|
| A | Ideal rectangular load stroke | 1.63 |
| B | Pneumatic bumper of FIG. 1 (30 psi) | 2.08 |
| C | Spring supported linear bumper | 3.25 |
| D | 30 psi bumper, flexible bag only | 2.85 |
| E | 0 psi bumper, flexible bag only | 5.47 |

Table III shows that the stroke requirements for the preferred embodiment of this invention (curve B) are closest to the ideal minimum of 1.63 inches, while other bumper concepts may require more than twice the minimum bumper projection.

To summarize the practical significance of providing as nearly a rectangular load-stroke curve shape as possible by virtue of the rigid section of the preferred embodiment:

(1) For a given stroke requirement set by the stylist, the peak force is limited to approach the minimum, thus keeping the force/frame strength ratio to a safe level.

(2) For a given peak force dictated by the frame strength, the stroke is limited to approach the minimum, thus satisfying the cosmetic requirements of the stylist.

The limiting of the peak force and of the stroke is explained by Boyle's Law. The additional volume of the rigid section tends to limit the pressure increase within the bumper upon decrease in volume of the flexible section under impact.

Development of the Preferred Embodiment

To illustrate the major features of the invention and show the differences from prior art, FIGS. 14a-14e have been prepared giving the evolution from simple pneumatic bumpers of prior art to the full bumper system integrated with the vehicle it protects.

Figure 14A:
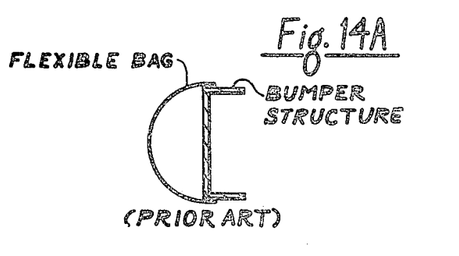
FIG. 14a is a vertical cross-sectional view in schematic form of a prior art form of pneumatic bumper.

FIG. 14a is typical of prior art pneumatic bumpers wherein a flexible bag is attached to a simple channel which supports the bag but does not contribute to the function of absorbing energy. The bag, being flexible, takes a shape with a large constant radius, as in a cylindrical balloon. This is not efficient from the basis of stroke required, nor is it amenable to shaping for styling or variations which are critical factors in the design of modern automobiles. If the bag is compressed full stroke, back to the support channel, the pressure would become very high and the load on the vehicle would be prohibitive. A load-stroke similar to that in FIG. 12, curve E, would result.

Figure 9:
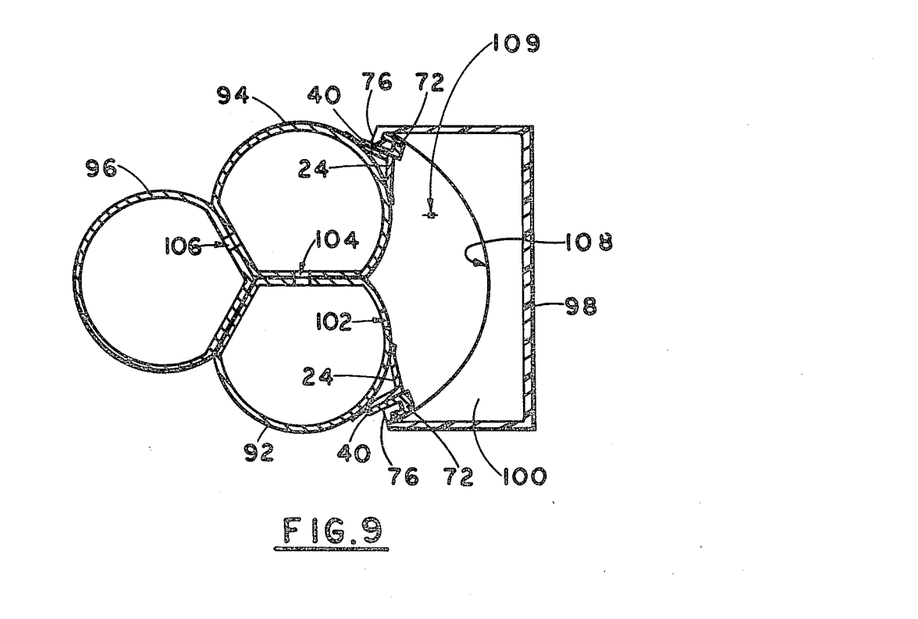
FIG. 9 is an alternative embodiment of the invention using multiple rigid sections or tanks.
Figure 10A:
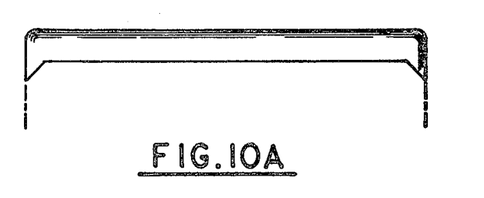
FIGS. 10a and b are plan-view sketches of ornamental designs of bumper shapes employing this invention.
Figure 10B:
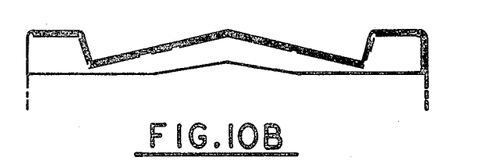
Figure 11A:
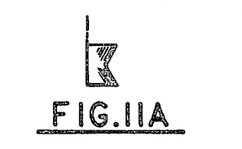
FIGS. 11a and b are elevation-view sketches of ornamental designs of bumper shapes.
Figure 11B:
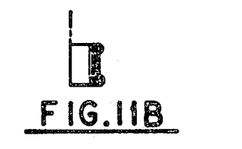
Figure 14B:
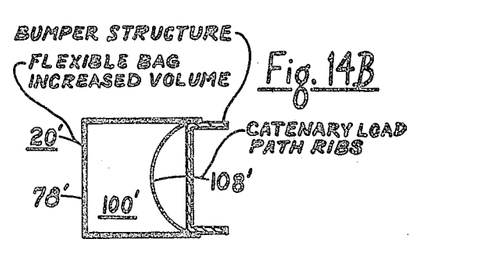
FIGS. 14b to d are similar views of different forms of this invention.

To avoid this excessive load condition, more stroke can be added so that the required amount of energy is absorbed before pressure build-up is too great. This approach is illustrated in FIG. 14b where the bag has more stroke and also has the catenary load path ribs appropriate to a bag without a rear closure (see FIG. 9). The load-stroke for this configuration is illustrated in FIG. 12, curve B. The bag has the shape controlling catenary ribs, and hence can be formed to styling requirements, but the depth (stroke) of the bag is comparatively large and would result in high fabrication costs. The simple channel structure provides support, but again does not contribute to the energy absorption function.

Figure 14C:
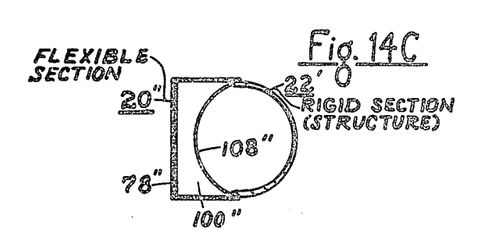

A lower cost solution to obtain the same stroke and performance is shown in FIG. 14c where the bumper has a shallower flexible section and a rigid section resulting in the same volume and load-stroke (curve B of FIG. 12). Since this stroke is adequate for the energy to be absorbed, the remainder of the bumper can be made rigid and also serve as the bumper structure. This provides one of the major features of the invention, the use of the rigid section both to furnish required volume and to act as the bumper structure, leading to a major reduction in weight and cost. The catenary load-path ribs are included to provide control of the bag surface, but the bag is smaller (i.e. shallower) and therefore less expensive to fabricate than that shown in FIG. 14b.

Figure 14D:
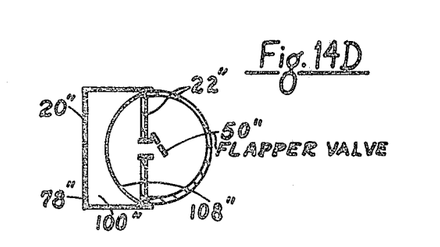
Figure 14E:
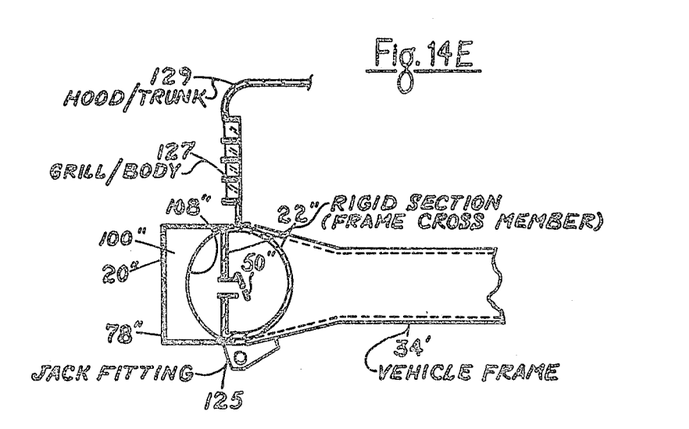

FIG. 14d shows the addition of a rigid wall between the flexible section and the rigid section with a valve to control flow between the two sections. The valve is made large enough to permit unrestricted flow from the bag into the rigid section but closes when flow is reversed, leaving only a small bleed hole to repressurize the bag to initial pressure. This flow control effectively reduces rebound to avoid the harmful effects thereof. The flexible bag is identical with that of FIG. 14c and the load-stroke is also curve B of FIG. 12.

A variation of the preferred embodiment is shown in FIG. 14e wherein several auxiliary features are illustrated. The bumper operation, flexible bag and load-stroke are the same as in FIG. 14d. The rigid section of the bumper may be formed of sufficiently thick steel or aluminum (e.g. of the order of 0.1 inch) so that it can be incorporated with the vehicle frame to act as the end cross member thereof or to reduce the requirements placed on the conventional cross member. This results in further reduction of weight and cost for the vehicle as a whole. A jack fitting for a bumper jack is shown supported by the rigid section of the bumper, and supports are also shown on the rigid section for the grille, fenders or other body parts. These support functions cannot be performed as well, or in some cases cannot be performed at all, by other bumper systems wherein a heavy bumper beam is supported by two or more energy absorbers in a unit package (e.g. hydraulic cylinders), since such bumper beam must move relative to the fenders or other body parts upon impact. The preferred embodiment shown in FIG. 14e is a total functional and structural integration of the bumper system with the vehicle to yield a low cost, efficient design.

Other embodiments of the invention and various features and characteristics thereof are described in applicant's predecessor co-pending patent U.S. Pat. No. 3,971,583, the descriptions of which are here incorporated by reference.

Advantages of the air cushion bumper with respect to pedestrian safety are due to the low pressure that it will impose on impacting the pedestrian, such as in the legs, as compared with the stresses that would result from impact by a metal bumper or a metal bumper having a thin pad of resilient material. The stress imposed by the air cushion is limited to the inflation pressure, about 30 psi, which can be withstood by the body, while a steel bumper has an allowable bearing stress in the order of 50,000 psi, which would crush bone.

Additional safety advantages of the air cushion bumper can be realized from use of characteristics inherent to the system. The increase in air pressure in the bumper due to impact can be used to implement the operation of other safety systems for passenger and vehicle safety. Safety devices such as internal bags for positioning passengers can be inflated by a control device (not shown) actuated by an electrical signal from a sensor (e.g., a strain gauge) 108 (FIG. 3) in the rigid section 22, in response to the air pressure increase in the bumper. An automatic application of the vehicle brakes can also be implemented by a signal from such an air pressure sensor or from a diaphragm-actuated element in which the diaphragm is connected via a tube 110 to be responsive to the pressure in rigid section 22. Locking the brakes can be important if the vehicle driver is momentarily incapacitated in cases where a vehicle is struck from the rear and may roll forward to strike another vehicle. The locked brakes will also prevent much travel from residual rebound, or if a vehicle is on a grade sufficient to roll freely. This versatility in coordination with other safety systems is important in the bumper system which, by definition, is the first point of contact in case of a crash.

Figure 13:
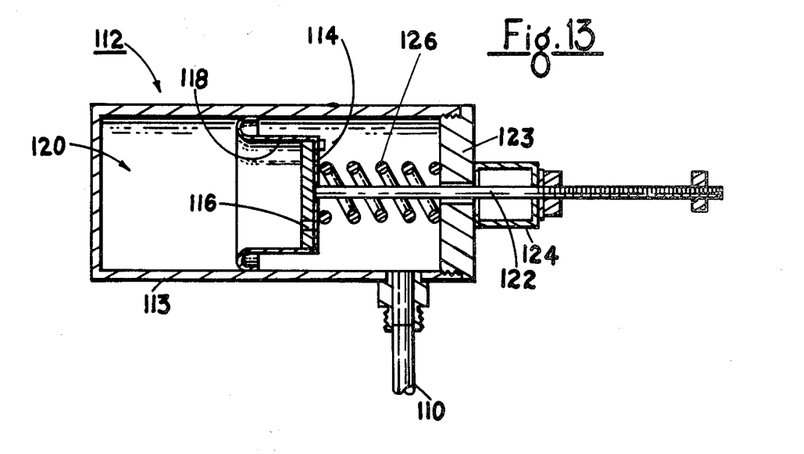
FIG. 13 is a schematic diagram of an impact velocity sensor which may be used with the safety system of FIG. 3.

Several theoretical approaches may be adopted for purposes of triggering the safety devices within the passenger compartment of the vehicle, with the basic requirement that velocity of impact must exceed 15–30 mph before actuation may be permitted. In this application, the requirement of sensing impact velocity may be fulfilled by making use of the rate-of-change of bumper pressure, which is proportional to impact velocity. In one arrangement, the rate of flow of gas from bag to rigid section may be used, since it is proportional to impact velocity and proportional to the pressure difference across the orifice between bag and rigid section. This pressure difference may be sensed by a differential pressure gauge having its two input ports respectively connected to the bag and rigid section and used directly for activation purposes when the sensed pressure difference is at the required level. Another arrangement of an impact velocity sensor 112 is shown in FIG. 13, in which air pressure from the bag or rigid section 22 via tube 110 of sufficiently large diameter is delivered into a casing 113 to one side of a movable piston 114 which contains an orifice 116 and which is mounted on slack diaphragm 118 for movement in a closed chamber 120 on the other side of the piston. Connected to the latter is an actuating rod 122 which moves through a casing wall 123 which is sealed by a diaphragm 124 around the rod 122 and wall opening. A spring 126 balances the piston in a normal intermediate position and balances the air pressure on sealing diaphragm 124. The orifice size and the chamber volumes on opposite sides of the piston are selected so that impacts above a certain velocity (e.g. 15–30 mph) produce a pressure rise fast enough to cause motion of the piston 114 into chamber 120. Slower pressure rises do not cause piston motion because air flows through the orifice too quickly to permit enough pressure difference to develop across the piston. For example, a 30 mph impact on the illustrative example of the FIG. 1 bumper, having a bag of about 2 inches deep, results in a pressure rise from about 30 psi to 38 psi in several milliseconds. Under these conditions, the piston 114 is moved by the pressure developed across the orifice 116 and the concomitant rod movement can be effective for actuating a safety or control device as noted above. For example, the actuating rod 122 of the impact velocity sensor 112 can operate a valve 128 (FIG. 3) between a large diameter output port 130 of the rigid section 22 and a conduit 132 to a safety device. At the critical impact velocity, the valve 128 is opened to pass the compressed air from the rigid section 22 to a safety device such as an air bag to inflate it or otherwise operate it. Collisions of such velocity are likely to be so damaging that safety calls for use of the compressed air of the bumper system directly for protection of passengers where possible.

The air cushion bumper can be designed to withstand a 10 mph impact rather than a 5 mph by increasing the cushion depth (stroke) to accommodate 10 mph (e.g. a stroke of about 10 inches vs. 4 inches) at the acceptable deceleration level for the vehicle and occupants. The rigid section volume and air pressure can then be defined to achieve a balanced design. Impact surface area of the cushion as well as inflation pressure may also be increased for increasing the capability of the system. Similar changes can accommodate higher speeds, and if the vehicle is strengthened sufficiently to take higher deceleration loads, crashes at speeds of 20 to 30 mph can be tolerated with no damage to the vehicle. Systems of this nature must be coupled with internal restraints to the occupants to avoid serious injury under the high sustained deceleration. Still higher velocities, to 60 mph at least, can be accommodated if the bumper is increased in height, stroke and inflation pressure leading to more energy-absorption capability.

The various features of this invention that are not specifically limited to a closed bumper system may be used in various forms of refillable systems. For example, the advantages of this invention described above with respect to force and stroke limiting apply generally as well as a refillable pneumatic bumper embodying this invention which exhausts to the atmosphere and is thereafter refilled with compressed air. Thus the force and stroke limiting advantages indicated by curves B in FIGS. 12a and b also apply to the refillable system and may be increased by proper large sizes of relief valves. In both systems, the internal surfaces of the impact and other walls are shaped to maintain a generally longitudinal tension in those exterior walls between the flexible webs. As a consequence, the external surfaces of those exterior walls are maintained in a certain desired wall shape. This wall shape can be considerably varied to meet ornamental preferences, but consistent with ornamental compromise the shape of the wall surfaces can nevertheless approach the planar surfaces which tend to produce the optimum limitation of force and stroke.

Figure 15:
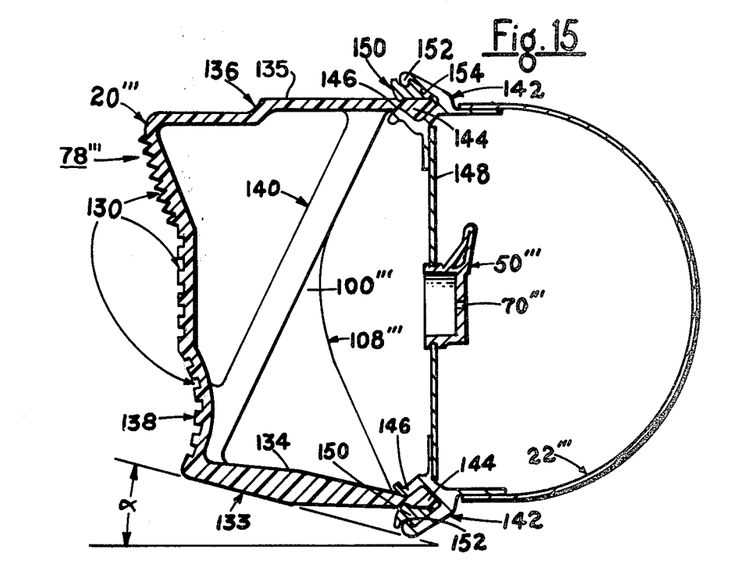
FIG. 15 is a vertical cross-sectional view of another embodiment of this invention.
Figure 16:
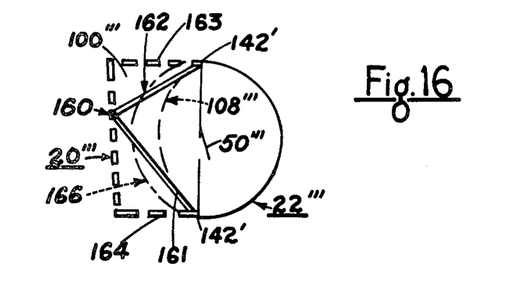
FIG. 16 is a schematic diagram of the bumper of FIG. 15 in vertical cross-sectional view.

A salient feature of this invention is the shaping of the flexible section of the bumper to attain a generally rectangular cross-section in opposition to the gas pressure. This rectangular cross-section tends to achieve an optimum bag volume for a particular ornamental design, and thereby serves to limit the stroke of the impact wall. Since the ornamental design of vehicles (e.g. passenger cars) customarily strongly influences the functional design and sometimes overrides it, it is difficult to define the exact shape of the flexible bag. However, by means of this invention, though substantial departure from the rectangular cross-section may result for ornamental or for functional reasons, the resulting cross-section can still be in large measure rectangular (as may be seen in FIG. 15) so that the bag volume is optimized and thereby advantages in limitation of force and stroke are achieved.

Other modifications of the invention will be apparent from the above description. For example, in certain special applications it may be desirable to have a flat metal face in front of the flexible section. One form of this arrangement would be to locate the rigid section in front of the pneumatic section so that the impact is applied to the rigid section.

A modification of the device for operating safety systems employs a pneumatic bumper of the types described above with an electrical device for sensing the impact velocity and for discriminating between the lower impact velocities and the higher more dangerous ones at which safety systems are to be operated. The pneumatic bumper may be normally supplied with compressed gas substantially above atmospheric pressure or operate normally at atmospheric pressure in the manner described above.

One form of electrical velocity sensor (an electrical counterpart of the pneumo-mechanical velocity sensor of FIG. 13) employs a piezoelectric crystal type of strain gage 108 (FIG. 3) which generates an electric signal proportional to the gas pressure produced in the rigid section 22. This signal (as an electric charge) varies in magnitude with the change of pressure applied to the crystal. This signal is applied as the input to a trigger circuit via a decay circuit that has a certain short-time constant and bleeds off the charge so as not to operate the trigger under low impact velocity conditions. The threshold of the trigger circuit is so set that the trigger operates and generates a trigger impulse when the impact pressure rises sufficiently rapidly, corresponding to a sufficiently high impact velocity. Under this condition, the piezoelectric crystal generates the charge at a rate higher than the decay circuit's rate of bleeding off the charge, thereby allowing the accumulated charge quickly to reach the threshold trigger voltage. This trigger impulse is used to actuate a suitable electronic relay (such as a silicon controlled rectifier) or an electro-mechanical relay to control the operation of the safety device—e.g. to control the operation of valve 128 to inflate an air bag.

Where the pneumatic bumper is normally supplied with compressed gas, that gas supply may also be used for inflation of the air bag via valve 128 as described above. Where the bumper gas is normally at atmospheric pressure, a separate source of compressed gas may be used for air bag inflation.

Although the prime applications described for the bumper herein have been for over-the-road vehicles, other applications are readily apparent and still others will occur to those skilled in the art who are designing energy-absorbing apparatus. Other applications include use on truck loading docks and platforms to prevent damage to the docks and trucks using them, on farm machinery not normally traveling over the road (trucks, wagons, tractors), and as fenders on boats and boat-docks, on construction machinery exposed to handling materials such as rocks, and requiring energy-absorption for that purpose, or for contact between two machines as a tractor being used to push a scraper, on fixed installations adjacent to highways including on guard rails, divider strips, traffic islands, signal installations, toll booth structures, and retaining walls, and in industrial plants requiring handling of heavy materials and energy-absorption of carts, dollies, pallets, conveyors and handling vehicles.

While the foregoing has described what are at present considered to be the preferred embodiments of the invention, it will be apparent that various modifications and other embodiments within the scope of the invention will occur to those skilled in the art. Accordingly, it is desired that the scope of the invention be limited by the appended claims only.

What is claimed is:

1. In a vehicle equipped with at least one inflatable air bag for protecting at least one passenger of the vehicle in case of an accident, wherein an inflation assembly for said bag comprises a pressurized gas tank having a front portion and at least one branch portion in a continuous configuration extending from said front portion of said pressurized gas tank, said branch portion connecting said front portion to said at least one inflatable air bag, said front portion mounted in the front region of the vehicle and extending transversely of the vehicle longitudinal axis from one side to the opposite side of the vehicle; and at least one automatic valve, said one automatic valve connected between the pressurized gas tank and each associated inflatable air bag, said pressurized gas tank inflating said air bag upon impact during an accident, without the use of separate sensors, due to a sudden increase in pressure within the gas tank which causes said valve to open.

2. An inflation assembly for a vehicle as defined in claim 1 wherein each of the valves is mounted on an input conduit of an associated air bag.

3. An inflation assembly for a vehicle as defined in claim 1 wherein said pressurized gas tank has an approximately U-shaped configuration and a central portion of said pressurized gas tank extends along the front of the motor vehicle.

4. An inflation assembly for a vehicle as defined in claim 1 wherein said pressurized gas tank or a portion thereof forms a part of a front bumper bar assembly of the vehicle.

5. An inflation assembly for a vehicle as defined in claim 4 wherein said pressurized gas tank is filled with a gaseous fluid at a pressure in the range from 20 to 40 psig.

6. An inflation assembly for a vehicle as defined in claim 1 and further comprising a compressor, said pressurized gas tank being coupled to said compressor.

7. An inflation assembly for a vehicle as defined in claim 1 wherein a conventional inflator valve is mounted on said pressurized gas tank.

8. A bumper apparatus for a vehicle comprising:
   (a) a flexible bag structure having flexible exterior walls forming a cavity for containing a gas compressed under impact to a substantial pressure to absorb the energy of a collision of said vehicle applied over an impact portion of said exterior walls;
   (b) means for attaching said bag structure to a vehicle with said impact wall portion in a generally upright orientation;
   (c) and means responsive to the pressure rise of said gas for actuating a protection device on said vehicle.

9. The bumper apparatus as recited in claim 8 wherei said actuating means includes means for supplying said compressed gas as the motive power for actuation of said protection device.

10. The bumper apparatus as recited in claim 8 wherein said protection device includes an inflatable air bag.

11. The bumper apparatus as recited in claim 8 wherein said bag structure includes means for forming said exterior walls to have a certain shape in opposition to said gas pressure so as to limit the stroke of said walls under impact, said exterior wall forming means including load bearing means connected along said exterior walls and between a plurality of spaced fixed parts of said bag attaching means;

12. A bumper system for a vehicle comprising:
a pneumatic container for a compressible gas whose pressure increases under impact and having a flexible portion with an impact surface;
and means responsive to the gas pressure in said container for producing a control signal in accordance with a certain rate of change in pressure produced upon impact with an object.

13. A bumper system as recited in claim 12 for use with a passenger safety device, and further comprising means responsive to said control signal for operating said safety device.

14. A bumper system as recited in claim 12 in combination with a pneumatic device for passenger safety, including means for connection to said pneumatic container to direct the passage of compressed gas to said device from said container.

15. A bumper system as recited in claim 14 and further comprising means responsive to said control signal for controlling said connection means to pass said compressed gas to said safety device.

16. A bumper system as recited in claim 14 wherein said pneumatic safety device includes an inflatable air bag.

17. A bumper system as recited in claim 12 wherein said responsive means includes strain gage means for generating said control signal.

18. A bumper system as recited in claim 17 wherein said strain gage includes a piezoelectric crystal.

19. A bumper apparatus as recited in claim 8 wherein the normal pressure of said compressible gas is substantially greater than atmospheric pressure.

20. A bumper apparatus as recited in claim 8 wherein the normal pressure of said compressible gas is substantially atmospheric pressure and substantially increased under impact.

* * * * *